Dec. 13, 1938.   S. W. H. W. FALLOON   2,140,004
ELECTRICAL OSCILLATION GENERATOR
Filed Jan. 13, 1937
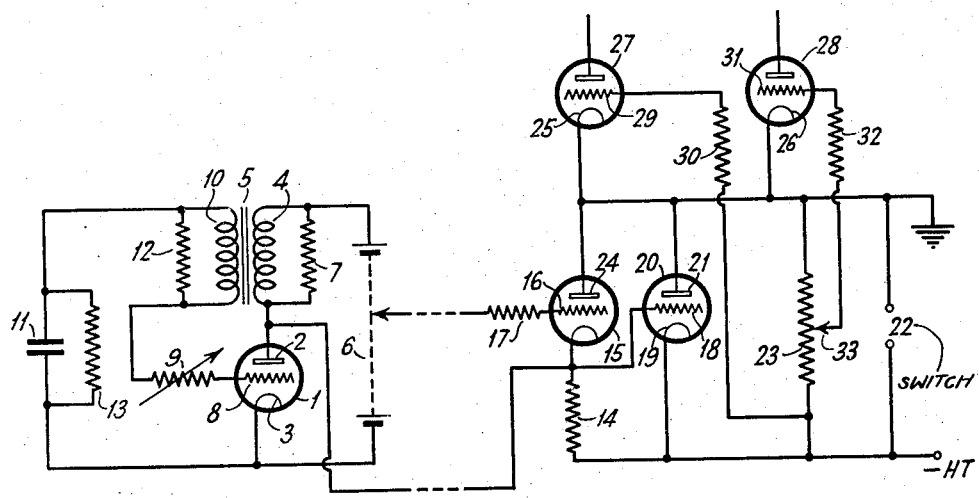
INVENTOR
SHIRLEY WALDRON HUGH WOLSELEY FALLOON
BY
ATTORNEY Patented Dec. 13, 1938

2,140,004

UNITED STATES PATENT OFFICE 2,140,004

ELECTRICAL OSCILLATION GENERATOR

Shirley Waldron Hugh Wolseley Falloon, Chelmsford, England, assignor to Radio Corporation of America, a corporation of Delaware Application January 13, 1937, Serial No. 120,337
In Great Britain February 3, 1936

1 Claim. (Cl. 250—36)

This invention relates to electrical oscillation generators and more particularly to generators for producing repeated sharp pulses.

The object of the invention is to provide a pulse generator which need not be "locked" from alternating current mains or from any other source of controlling voltage and which, despite the absence of "locking" will give short pulses sufficiently steadily at a desired repetition frequency to allow of reception and accurate delineation on a cathode ray tube with repeating time sweep.

There are numerous cases where such a pulse generator would be of practical advantage, for example in connection with direction finding pulse transmitters.

According to this invention, an electrical pulse generator comprises a thermionic valve whose output and input circuits are back coupled by a differentiating coupling system in such sense that an increase in anode current causes the application to the grid circuit of a voltage of such sign as to cause grid current to flow, and in the grid circuit of said valve is included also a leaky condenser unit which by its capacity and leakage determines the repetition pulse frequency.

The invention is illustrated in the accompanying drawing which shows diagrammatically one embodiment of the invention and also illustrates one way in which the said embodiment may be connected to a low power radio or other transmitter.

Referring to the drawing, 1 is a valve which may be, as shown, an ordinary triode whose anode 2 is connected to the cathode 3 through the primary 4 of a transformer 5 and a source 6 of anode potential (for example of 120 volts) in series, as shown. The transformer 5 is iron cored (though an air cored transformer might be used) and the primary 4 is shunted by a resistance 7 which serves as a damping resistance. The grid 8 is connected to the cathode 3 through a resistance 9, the secondary 10 of the transformer 5 and a condenser 11 all in series, as shown, the secondary 10 being shunted by a damping resistance 12 and the condenser 11 being shunted by a leak resistance 13. The leak resistance 13 will be of a value depending upon requirements and may be of a value, for example, between 1 and 10 megohms. The condenser 11 may be of any value from about .0001 mfds. upwards, depending upon requirements, its value being so chosen that the product of its capacity into the leak resistance 13 is of the same order as the repetition period required. The resistance 9 may be variable, for example, between the values zero and ¼ megohm,—a value of 100,000 ohms is quite a practical setting. The value of this resistance controls the duration of the pulses generated. The resistances 7 and 12 may be from about 10,000 to about 100,000 ohms each.

In operation, when anode potential is first switched on (no switch is shown) the anode current increases rapidly from zero to a steady value, determined by the constants of the circuit and notably by the constants of the valve. Owing to the differentiating action of the back coupling transformer 5, while the anode current is increasing there will appear across the secondary 10 an E. M. F. of such sense as to cause grid current to flow, and this results in the charging of the condenser 11 to a high potential which may, in practice, be 300 or more volts for an anode potential of about 120 volts.

As soon as the anode current has reached its steady value the E. M. F. set up across the secondary 10 disappears, leaving the grid 8 at a large negative potential due to the charge on the condenser 11 and accordingly the anode current ceases. The charge on the condenser 11 then leaks away through the leak resistance 13 until anode current is again permitted to commence to flow, whereupon the whole cycle of operations is repeated.

The wave form of the potential on the anode of the valve will be approximately rectangular and will consist of lengths of horizontal line joined by approximately rectangular "dips" in the negative direction and of an amplitude of the same order as the anode potential value. The width of each "dip" (measured along the abscissae line, i. e. in time) will be dependent mainly upon the value of the first resistance in the grid circuit, while the length of the horizontal portions between "dips" will depend mainly upon the values of the condenser and leak resistance.

In practice, a pulse generator as above described may easily be arranged to generate pulses of a duration which may be adjusted to a desired value between about $3 \times 10^{-3}$ secs. and $10^{-4}$ secs. at a repetition frequency which may be adjusted to a desired value between 1 or 2 per second up to about 300 or 400 per second.

A pulse generator as above described may be used, for example, to key a low power radio transmitter in any convenient way. For example, as shown in the drawing, the anode 2 of the valve 1 may be connected to the cathode end of a resistance 14 in the cathode leg of a first modulator valve 15 whose grid 16 is connected through a resistance 17 to a suitable tap on the source 6. The resistance 14 is shunted by the grid-cathode space 18, 19 of a final modulator valve 20 whose anode cathode space 21, 19 is shunted by a key or switch (not shown) connected at 22 and also by an auto-bias keying resistance 23. The anodes 21, 24 of the valves 20, 15 are connected together and to earth, and also to the cathodes 25, 26 of the valves 27, 28, the former of which is the oscillator of the transmitter and the latter an amplifier. The grid 29 of the oscillator valve 27 is connected to the HT-terminal through a grid leak resistance 30 and the grid 31 of the amplifier valve 28 is connected to a suitable (if desired adjustable) tap 33 on the resistance 23 through a resistance 32. Suitable practical values of the resistances 14, 17 are, respectively: 100,000 ohms—extremely high values; 20,000 ohms—50,000 ohms.

What is claimed is:

A rectangular wave electrical pulse generator comprising an electron discharge device having an anode, cathode and grid, a transformer having a primary and a secondary winding, a resistance in shunt of each of said windings, a connection from one terminal of said primary winding to said anode, and a connection including a source of potential from the other terminal of said primary to said cathode, a connection including a series resistance from one terminal of said secondary to said grid, and a connection including a series condenser from the other terminal of said secondary to said cathode, and a leak resistance in shunt with said condenser, said secondary winding being differentially coupled to said primary such that an increase in current in said primary causes the application of a voltage to said grid through said secondary of such sign as to cause grid current to flow, the value of said series resistance being such that there is produced in said anode circuit a square wave form, the constants of said series condenser and said leak resistance determining the frequency of the pulses produced by said generator.

SHIRLEY WALDRON HUGH
WOLSELEY FALLOON.